(12) United States Patent
Izumi

(10) Patent No.: US 7,414,959 B2
(45) Date of Patent: Aug. 19, 2008

(54) COMMUNICATION DEVICE FOR RECEIVING AND TRANSMITTING OFDM SIGNALS IN A WIRELESS COMMUNICATION SYSTEM

(75) Inventor: Seiichi Izumi, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

(21) Appl. No.: 11/558,978

(22) Filed: Nov. 13, 2006

(65) Prior Publication Data

US 2007/0064825 A1   Mar. 22, 2007

Related U.S. Application Data

(63) Continuation of application No. 11/248,988, filed on Oct. 12, 2005, which is a continuation of application No. 09/935,925, filed on Aug. 23, 2001, now Pat. No. 7,085,223.

(30) Foreign Application Priority Data

Aug. 24, 2000   (EP)   ................... 00118418

(51) Int. Cl.
*H04J 11/00* (2006.01)
(52) U.S. Cl. .......................... 370/203; 455/59
(58) Field of Classification Search .......... None
See application file for complete search history.

(56) References Cited

U.S. PATENT DOCUMENTS

| | | | |
|---|---|---|---|
| 4,126,828 A | 11/1978 | Kumagai | |
| 4,509,206 A | 4/1985 | Carpe et al. | |
| 4,955,073 A | 9/1990 | Sugayama | |
| 5,203,012 A | 4/1993 | Patsiokas et al. | |
| 5,682,376 A | 10/1997 | Hayashino et al. | |
| 5,771,224 A | 6/1998 | Seki et al. | |
| 5,784,363 A | 7/1998 | Engstrom et al. | |
| 5,867,478 A | 2/1999 | Baum et al. | |
| 6,292,511 B1 | 9/2001 | Goldston et al. | |
| 6,304,611 B1 | 10/2001 | Miyashita et al. | |
| 6,545,997 B1 * | 4/2003 | Bohnke et al. | 370/347 |
| 6,608,863 B1 * | 8/2003 | Onizawa et al. | 375/232 |

(Continued)

FOREIGN PATENT DOCUMENTS

EP   0 844 765   5/1998

(Continued)

*Primary Examiner*—Firmin Backer
*Assistant Examiner*—Phuongchau B Nguyen
(74) *Attorney, Agent, or Firm*—Oblon, Spivak, McClelland, Maier & Neustadt, P.C.

(57) ABSTRACT

A communication device for receiving and transmitting OFDM signals in a wireless communication system, in which each OFDM signal is composed of a plurality of subcarrier signals each being assigned to a respective transmission channel of said communication system, including a diversity antenna unit including a plurality of antenna elements; an examination unit adapted for examining, individually for each antenna element, at least one subcarrier signal of an OFDM reception signal received by a respective one of the antenna elements and for gaining, from the result of such subcarrier signal examination, attenuation information on attenuation properties of at least some of the transmission channels associated to the respective antenna element; and an amplitude adjustment unit adapted for adjusting, individually for each antenna element, the amplitude of at least one subcarrier signal of an OFDM transmission signal to be transmitted from a respective one of said antenna elements.

6 Claims, 3 Drawing Sheets

U.S. PATENT DOCUMENTS

| | | |
|---|---|---|
| 6,628,638 B1 | 9/2003 | Sato et al. |
| 6,700,865 B1 | 3/2004 | Yamamoto et al. |
| 6,842,421 B1 | 1/2005 | Sarraf et al. |
| 6,954,420 B1 * | 10/2005 | Wolf et al. .................. 370/203 |
| 7,020,072 B1 | 3/2006 | Li et al. |
| 2002/0097668 A1 | 7/2002 | Izumi |
| 2002/0154705 A1 | 10/2002 | Walton et al. |
| 2005/0207334 A1 * | 9/2005 | Hadad ........................ 370/203 |

FOREIGN PATENT DOCUMENTS

| | | |
|---|---|---|
| EP | 0 881 782 | 12/1998 |
| EP | 001182817 A1 | 2/2002 |
| GB | 2 300 546 | 11/1996 |

* cited by examiner

COMMUNICATION DEVICE FOR RECEIVING AND TRANSMITTING OFDM SIGNALS IN A WIRELESS COMMUNICATION SYSTEM

CROSS-REFERENCE TO RELATED APPLICATIONS

This application is a continuation of and claims the benefit of priority from U.S. application Ser. No. 11/248,988, filed Oct. 12, 2005, which is a continuation of U.S. Pat. No. 7,085,223, issued Aug. 1, 2006 and is based upon and claims the benefit of priority from European Application No. 00 118 418.3, filed Aug. 24, 2000, the entire contents of all of which are incorporated herein by reference.

BACKGROUND OF THE INVENTION

Field of the Invention

Related Background Art

The present invention relates to a communication device for receiving and transmitting OFDM signals in a wireless communication system.

In wireless OFDM communication systems a communication device, as e.g. a base station, communicates with another communication device, as e.g. a mobile terminal, over a wireless communication link using OFDM signals. OFDM (orthogonal frequency division multiplex) is a multi carrier modulation method wherein information to be transmitted is mapped (e.g. by phase shift keying) onto a plurality of orthogonal subcarriers signals of different frequencies which are subsequently combined into an OFDM signal. Each subcarrier frequency defines a transmission channel in which information can be transmitted over the communication link. For more background information on OFDM it is referred, for example, to K. David, T. Benkner: "Digitale Mobilfunksysteme", B. G. Teubner Stuttgart, 1996, S. 174-176.

The communication link causes undesired level fluctuations and distortion of the transmitted OFDM signal, e.g. due to fast fading or delay spread. Diversity methods can alleviate the adverse effects of fading. Using a plurality of antenna elements spaced apart at a certain minimum distance allows, by suitably combining reception signals received by the various antenna elements, to reliably recover the baseband information sent from another communication device even if fading occurs on one or more of the transmission paths across the communication link (receiver diversity). Transmitting one and the same transmission signal mutually delayed from several antenna elements allows to create a beam sharpened antenna pattern and to increase the received signal power at the receiver side (transmitter diversity). For more background information on receiver and transmitter diversity see, for example, EP 0 881 782 A2.

SUMMARY OF THE INVENTION

In receiving OFDM signals by array antennas or any other diversity antennas, heavy amplitude fading may occur to the entire OFDM signal at one (or more) of the antenna elements of the diversity antenna. However, it has been found that often amplitude fading does not occur to all of the subcarrier signals of an OFDM signal to the same extent. In some cases it can be observed that only particular ones of the subcarrier signals are subject to amplitude fading while other subcarrier signals and possibly even the OFDM signal as a whole do not show any severe amplitude fading.

This can be seen in FIG. 1 which schematically shows an example for the frequency selectivity of fast fading. In FIG. 1, the horizontal abscissa indicates the subcarrier number n and the vertical ordinate indicates the signal amplitude A of the aligned preamble OFDM subcarriers, wherein eight antenna elements are positioned to form a circle. Note that the dip in the center is not due to any fading but to the fact that in the Bran Hiperlan2 approach being the base for the simulation the center subcarrier is not used. By assuring that there is no DC component in the baseband signal the demodulation complexity is reduced. However, FIG. 1 clearly shows a frequency selective fading which might appear depending on the application environment.

Having discovered these effects, it is the object of the present invention to reduce the energy consumption at the transmitter side by taking advantage of the above insight. Furthermore it is the object to optimize the signal energy at the receiving antenna on the same basis.

According to a first aspect, the invention provides a communication device for receiving and transmitting OFDM signals in a wireless communication system, in which each OFDM signal is composed of a plurality of subcarrier signals each being assigned to a respective transmission channel of the communication system, the communication device comprising:

diversity antenna means including a plurality of antenna elements, examination means adapted for examining, individually for each antenna element, at least one subcarrier signal of an OFDM reception signal received by a respective one of the antenna elements and for gaining, from the result of such subcarrier signal examination, attenuation information on attenuation properties of at least some and preferably all of the transmission channels associated to the respective antenna element, and amplitude adjustment means adapted for adjusting, individually for each antenna element, the amplitude of at least one subcarrier signal of an OFDM transmission signal to be transmitted from a respective one of the antenna elements in accordance with the attenuation information, such as to give a higher amplitude to the subcarrier signal of the OFDM transmission signal when the attenuation information indicates a lower attenuation of the associated transmission channel, and to give a lower amplitude to the subcarrier signal of the OFDM transmission signal when the attenuation information indicates a higher attenuation of the associated transmission channel.

The inventive solution takes benefit of the above observation (i.e. subcarrier dependence of amplitude fading) and reduces the amplitude of those subcarrier signals of the OFDM transmission signal at a particular antenna element which are expected to be subject to amplitude fading. As it is highly improbable for a transmission channel to be heavily disturbed at the same time at all antenna elements, amplitude reduction of a particular subcarrier signal being transmitted from one of the antenna elements will have—if at all—only negligible effect on the ability to reliably recover the information hidden in this particular subcarrier signal on the receiver side because the same subcarrier signal still will be transmitted from other antenna elements at normal or just slightly reduced amplitude. By giving a minor role to those subcarrier signals which, due to fading, will not reach the receiving communication device at a reasonable amplitude level, waste of useless energy can be avoided and signal interference caused by such useless energy at other receiving communication devices can be reduced. An evaluation as to which of the subcarrier signals of the OFDM transmission signal are likely to be subject to amplitude fading and therefore should be reduced in amplitude is done by examining an OFDM reception signal sent from the communication device intended to be addressee of the OFDM transmission signal. This signal examination is done individually for each antenna element.

It is conceivable that the amplitude adjustment means are adapted to suppress the subcarrier signal of the OFDM transmission signal to be transmitted from the respective antenna element when the attenuation information indicates that the attenuation of the corresponding transmission channel exceeds a predetermined threshold.

In a preferred embodiment of the invention, the communication device comprises memory means for storing data representing a predetermined reference signal, and the examination means are adapted for comparing a predetermined portion of the subcarrier signal of the OFDM reception signal with the reference signal and for gaining the attenuation information from the result of such comparison. In particular, the reference signal may comprise a reference preamble symbol, and the examination means may be adapted for comparing a preamble portion of the subcarrier signal of the OFDM reception signal with the reference preamble symbol.

The examination means may further be adapted for gaining, from the subcarrier signal examination, phase shift information on phase shift properties of at least some of the transmission channels associated to the respective antenna element. Then, phase adjustment means may be provided which are adapted for phase adjusting, individually for each antenna element, at least one subcarrier signal of said OFDM transmission signal in accordance with said phase shift information.

According to a second aspect, the invention provides a method for operating a communication device for receiving and transmitting OFDM signals in a wireless communication system, in which each OFDM signal is composed of a plurality of subcarrier signals each being assigned to a respective transmission channel of the communication system, the communication device comprising diversity antenna means including a plurality of antenna elements, the method comprising the steps of:

examining, individually for each antenna element, at least one subcarrier signal of an OFDM reception signal received by a respective one of the antenna elements and gaining, from the result of such subcarrier signal examination, attenuation information on attenuation properties of at least some and preferably all of the transmission channels associated to the respective antenna element, and adjusting the amplitude of at least one subcarrier signal of an OFDM transmission signal to be transmitted from a respective one of the antenna elements in accordance with the attenuation information, such as to give a higher amplitude to the subcarrier signal of the OFDM transmission signal when the attenuation information indicates a lower attenuation of the associated transmission channel, and to give a lower amplitude to the subcarrier signal of the OFDM transmission signal when the attenuation information indicates a higher attenuation of the associated transmission channel.

The above method may comprise the step of suppressing the subcarrier signal of the OFDM transmission signal to be transmitted from the respective antenna element when the attenuation information indicates that the attenuation of the corresponding transmission channel exceeds a predetermined threshold.

In case that the communication device comprises memory means for storing data representing a predetermined reference signal, the method according to the present invention may comprise the step of comparing a predetermined portion of the subcarrier signal of the OFDM reception signal with the reference signal and gaining the attenuation information from the result of such comparison. In particular, the reference signal may comprise a reference preamble symbol; then, a preamble portion of the subcarrier signal of the OFDM reception signal may be compared with the reference preamble symbol.

Additionally, there may be provided the step of gaining, from said subcarrier signal examination, phase shift information on phase shift properties of at least some of the transmission channels associated to the respective antenna element and phase adjusting at least one subcarrier signal of the OFDM transmission signal in accordance with the phase shift information.

According to yet another aspect, the invention provides a computer program which performs, when executed by a processor of a communication device, the method described above.

The present invention is explained in more detail in the following description in relation to the enclosed drawings, in which:

DETAILED DESCRIPTION

Figure 1:
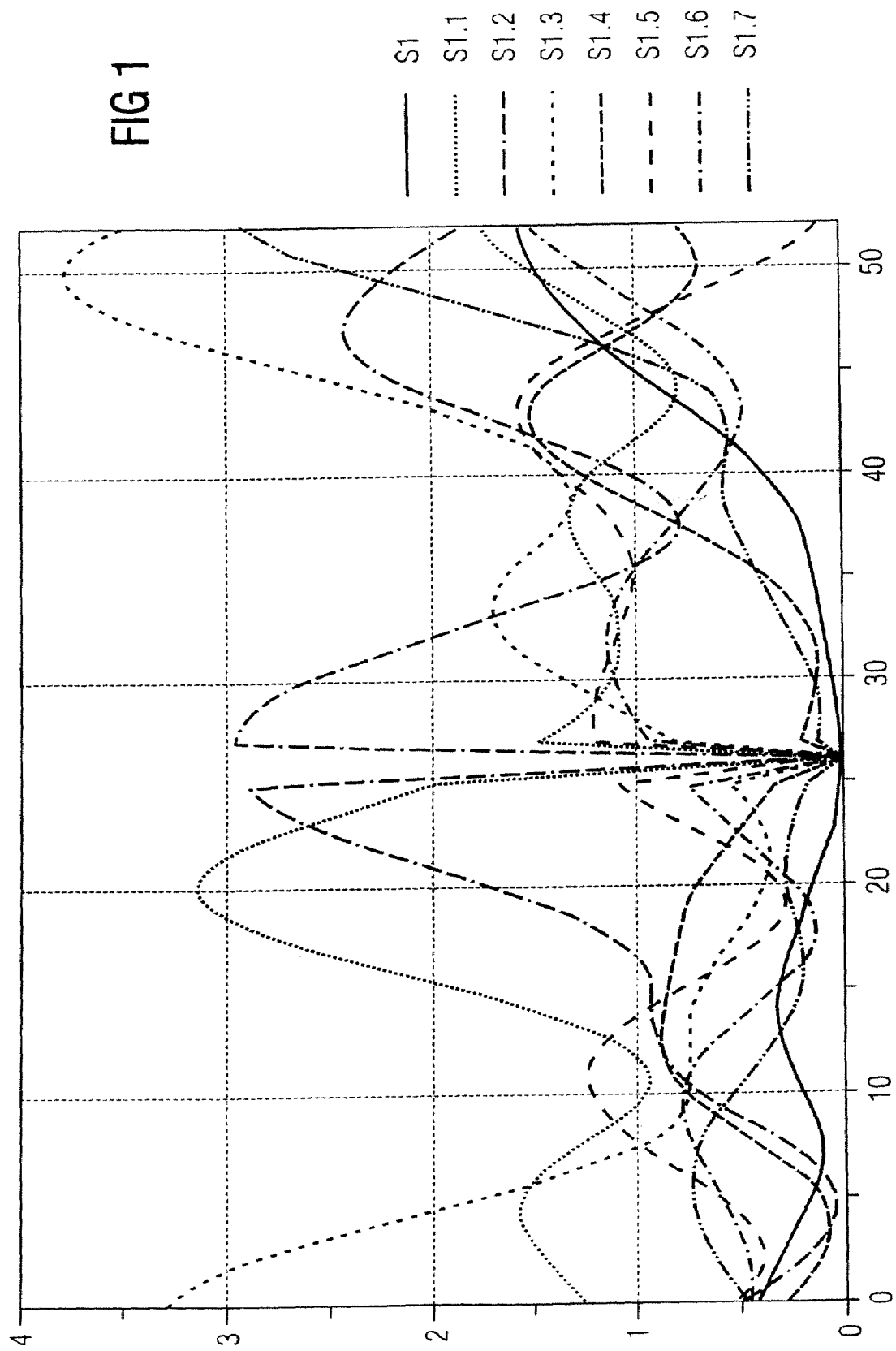
FIG. 1 is a schematic graph showing the magnitude of the aligned preamble OFDM subcarriers as a function of the subcarrier number.
Figure 2:
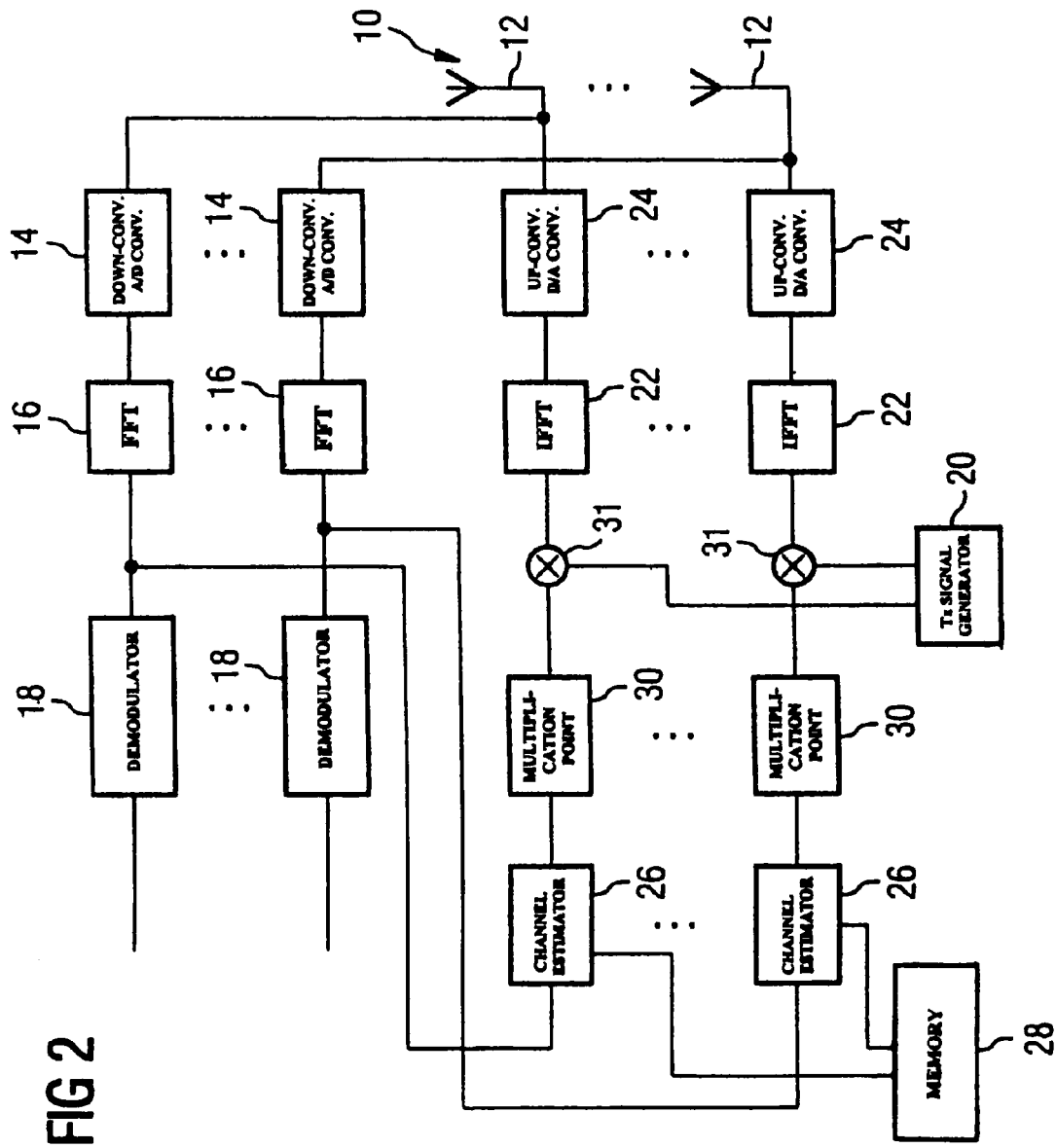
FIG. 2 is a schematic block diagram of a communication device according to an embodiment of the present invention, FIG. 3 schematically shows how a frequency domain channel estimation is performed within the communication device of FIG. 2, and FIG. 4a through 4c schematically show the generation of a complex weight coefficient.

The communication device illustrated in FIG. 2 may be, for example, a base station or a mobile terminal of a wireless TDMA-TDD communication system employing a time division multiplex access (TDMA) and time division duplex (TDD) technique for OFDM signal communication between the various communication devices of the communication system. The communication device comprises all components necessary for processing received OFDM signals and generating OFDM signals to be transmitted. In particular, the communication device comprises a diversity antenna, e.g. an array antenna, generally designated by 10. The diversity antenna 10 is comprised of a plurality of mutually spaced antenna elements 12 only two of which are shown. An OFDM signal sent from a distant mobile terminal (not shown) or another type of communication device is received by each antenna element 12. In general, there will be a phase difference between the incoming OFDM signals at the different antenna elements 12. The received OFDM signals are individually processed by the communication device according to the present invention. Particularly, the received OFDM signals pass through down-conversion and analog-to-digital conversion means 14, Fast Fourier Transforming (FFT) means 16, demodulation means 18 and subsequent processing means (not shown in detail), such as a deinterleaver, a channel decoder and a voice codec, which allow to recover the baseband information transmitted from the remote station or terminal. At some point in the signal processing chain there will be provided combining means for combining the different received OFDM signals according to a suitably selected combining technique which is per se well-known in the art.

In case the communication device wants to transmit an OFDM transmission signal to the remote station or terminal, this OFDM transmission signal is generated by transmission signal generation means 20 (which include such functions as channel coding, interleaving and modulation) and is subsequently supplied to Inverse Fast Fourier Transforming (IFFT) means 22 and up-conversion and digital-to-analog conversion means 24. The OFDM transmission signal then is transmitted from each antenna element 12 with a phase difference from one antenna element 12 to the next. The phase difference at transmission is determined based on the phase relationship between the incoming signals at the different antenna elements 12 at signal reception, so as to enhance signal power at the remote station or terminal and to reduce signal power at other places.

Figure 3:
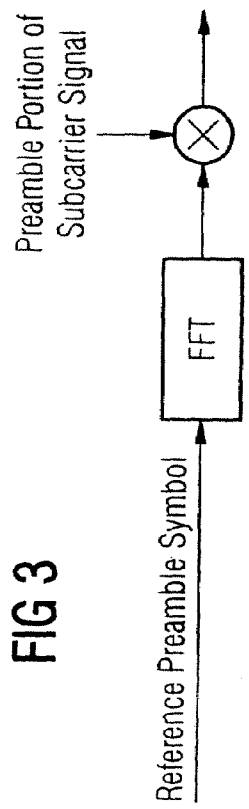

An OFDM signal is composed of a plurality of superposed subcarrier signals having different subcarrier frequencies. Channel estimation means 26 within the communication device according to the present invention determine an attenuation value for each subcarrier signal (better: for each transmission channel associated to a respective subcarrier frequency) of the received OFDM signal individually for each antenna element 12. The attenuation value gives a measure for the attenuation that the respective subcarrier signal was subjected to during its transmission from the remote station or terminal to the respective antenna element 12 of the communication device according to the present invention. Such attenuation may be caused e.g. by fast and slow fading. To determine the attenuation values, the channel estimation means 26 compare a preamble portion of at least one of the subcarrier signals with a known reference preamble symbol prestored in a memory 28. Particularly, the channel estimation means 26 compare the magnitudes of the preamble portion of the subcarrier signal and the Fourier transformed version of the reference preamble symbol and calculate a magnitude ratio (see FIG. 3). If necessary, the channel estimation means 26 perform a phase alignment of the preamble portion of the subcarrier signal with regard to the reference preamble symbol before carrying out the magnitude comparison.

Preferably, the channel estimation means 26 calculate the magnitude ratio only for a limited number of subcarrier signals out of the total number of subcarrier signals making up the OFDM reception signal at a respective one of the antenna elements 12. The channel estimation means 26 then determine the attenuation values for the remaining subcarrier signals from the calculated magnitude ratios by estimation, e.g. by interpolation or filtering. In this way, attenuation values for every transmission channel associated to a respective one of the antenna elements 12 can be obtained. However, it is to be understood that the channel estimation means 26 may be adapted to calculate the magnitude ratio for all of the subcarrier signals.

The channel estimation means 26 supply the attenuation values thus determined to signal adjustment means 30 which determine for each attenuation value a corresponding amplitude adjustment factor. Thus, an amplitude adjustment factor is determined in relation to each transmission channel associated to a respective antenna element 12. Each amplitude adjustment factor is applied, at a multiplication point 30, to the respective subcarrier signal of the OFDM transmission signal to be transmitted from the respective antenna element 12. In this way, the amplitudes of the subcarrier signals of the OFDM transmission signal are individually adjusted according to the attenuation conditions of the corresponding transmission channel. Particularly, the amplitude adjustment is such that a lower attenuation value results in a higher corresponding amplitude adjustment factor and thus in a higher amplitude of the corresponding subcarrier signal at the respective antenna element 12, and vice versa. There may be chosen a linear relationship between the magnitude ratio determined in relation to a particular transmission channel and the corresponding amplitude adjustment factor. Alternatively, a non-linear relationship may be chosen for this relationship. For example, the relationship may be chosen such that, when the magnitude ratio is below a predetermined threshold, the corresponding subcarrier signal at the respective antenna element 12 is suppressed. And if the magnitude ratio is above the threshold, the corresponding subcarrier signal is given a predetermined constant amplitude. In general, the choice of a suitable relationship between the magnitude ratio (i.e. the attenuation value) and the amplitude adjustment factor will be readily available to a person skilled in the art.

The above amplitude adjustment which, if necessary, is performed for each antenna element 12 individually on each subcarrier signal to be transmitted from the respective antenna element 12 allows to avoid transmission of useless energy on those transmission channels which have proved to be heavily disturbed by amplitude fading, thereby reducing power consumption of the communication device itself and liability to interference at other receiving communication devices due to transmission of meaningless energy.

The channel estimation means 26 may further determine, individually for each transmission channel of each antenna element 12, a phase difference value representative of the phase shift that the corresponding received subcarrier signal was subjected to during its transmission from the remote station or terminal to the respective antenna element 12 of the communication device according to the present invention. To this end, the channel estimation means 26 may determine the relative phase difference between the preamble portion of the respective subcarrier signal and the prestored reference preamble symbol mentioned above. Again, the channel estimation means 26 may calculate the relative phase difference individually for every subcarrier signal, or only for a selected group of subcarrier signals followed by an estimation process for the remaining subcarrier signals. From the phase difference values thus determined by the channel estimation means 26 the signal adjustment means 30 then determine suitable phase adjustment factors to be applied to the subcarrier signals of the OFDM transmission signal, so as compensate for the relative phase shifts that occur to the subcarrier signals transmitted from the different antenna elements 12 on their way to the remote station or terminal.

Figure 4B:
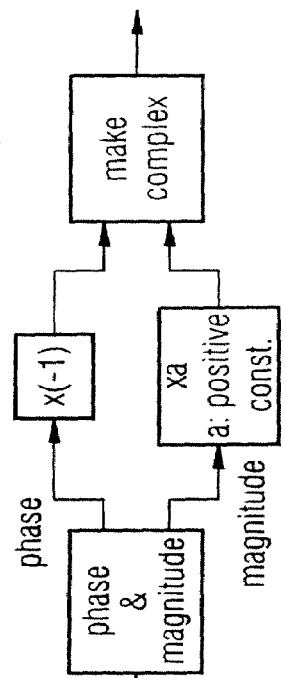
Figure 4A:
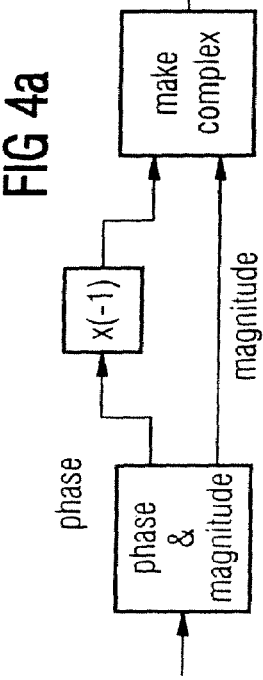
Figure 4C:
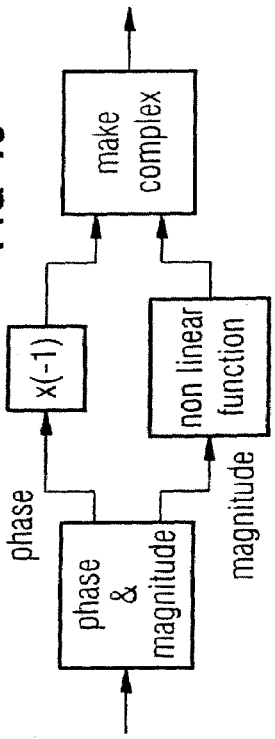

The amplitude adjustment factor and the phase adjustment factor for a particular subcarrier signal associated to a particular antenna element 12 may be represented by a complex weight coefficient which is applied to the respective transmission subcarrier signal. FIGS. 4*a* to 4*c* show three possibilities for generating the weight coefficient. In all three cases, the phase of the weight coefficient equals the phase determined by the channel estimation means 26 for the corresponding received subcarrier signal but has opposite sign. The magnitude of the weight coefficient can be equal (FIG. 4*a*) or proportional (FIG. 4*b*) to the subcarrier magnitude determined by the channel estimation means 26. Alternatively, the magnitude of the weight coefficient can be the result of a non-linear function, such as a threshold or square function, which has the subcarrier magnitude determined by the channel estimation means 26 as its input (FIG. 4*c*).

One of the objects of the present invention is to reduce unnecessary energy consumption at the transmitter. Furthermore, as will be shown in the following on the basis of a mathematical representation, the energy at the receiving antenna can be maximized when applying the concept of the present invention.

To maximize the total OFDM signal energy at the receiver, the amplitude ratio and phase at each transmitter antenna should be optimized. Now, we think about the $j^{th}$ subcarrier. M OFDM signals coming from M different transmitter antennas. They are already weighted by value $w_{jk}$. The combined signal can be written like $$\sum_{k=0}^{M-1} a_{jk} w_{jk}^*$$

Here, "*" is conjugate $a_{jk}$ is complex channel expression of $j^{th}$ subcarrier of OFDM signal comes from $k^{th}$ antenna. In vector expression, combined OFDM signal can be written as $$a_j w'_j$$

where $a_j=[a_{j0}, a_{j1}, \ldots, a_{jM}]$ is channel vector and $w_j=[w_{j0}, w_{j1}, \ldots, w_{jm}]$ is weight vector for $j^{th}$ subcarrier. Here, "'" is Hermitian transpose (conjugate transpose).

Power of combined signal will be $$(a_j w'_j)^2 = (a_j w'_j)'(a_j w'_j) = (w_j a'_j)(a_j w'_j) = w_j A_j A_j w'_j$$

The matrix A is a Hermitian matrix defined as $$A_j = a'_j a_j = \begin{bmatrix} a_0 \\ a_{jM}^* \end{bmatrix} [a_{j0} a_{jM}]$$

To maximize combined $j^{th}$ subcarrier of OFDM signal, it is said that weight vector, w, should be chosen to proportional of Eigenvector of maximum Eigenvalue of the matrix $A_j$.

In the other hand, any Hermitian matrix H can be expressed like $$H = \sum_j \lambda_j v'_j v_j$$

where $\lambda$ is Eigenvalue and $v$ is Eigenvector. If the expression of the matrix $A_j$ is compared with this expression of Hermitian matrix H, it can be seen that the matrix $A_j$ has only one Eigenvalue which is not zero, naturally maximum Eigenvalue, and its eigenvector is $a_j$ Eigenvalue of the matrix $A_j$ is inner product of $a_j a^*_j$ and Eigenvector is usually normalized like $a_j/(a_j a^*_j)^{1/2}$.

Again, to maximize the combined $j^{th}$ subcarrier of OFDM signal, weight vector, $w_j$, should be proportional to vector $a_j$.

For other subcarriers, set of complex channel expression of each channel (antenna), channel vector, shall be weighting vector. Complex channel expression of each antenna and subcarrier is known at channel estimation method.

(Normalization of weight vector is not necessary, because ratio between antennas and subcarriers are important.)

The invention claimed is:

1. Communication device for transmitting and receiving OFDM signals in a wireless communication system, the communication device comprising:
   antenna means having a plurality of antenna elements for transmitting and receiving said OFDM signals propagated through a plurality of transmission channels in said wireless communication system;
   means for obtaining channel information concerning attenuation properties of OFDM subcarrier signals transmitted through said plurality of transmission channels; and
   means for controlling amplitude of said OFDM subcarrier signals in accordance with said channel information,
   wherein said means for obtaining channel information calculates a magnitude ratio for a limited number of OFDM subcarrier signals received at each of said antenna by comparing a predetermined portion of said limited number of OFDM subcarrier signals with a reference preamble symbol to obtain the attenuation properties of said limited number of OFDM subcarrier signals
   and then determines the attenuation properties of the rest of OFDM subcarrier signals from said calculated magnitude ratio by estimation.

2. Communication device according to claim 1, wherein said means for obtaining channel information determines the attenuation properties of the rest of OFDM subcarrier signals by interpolation or filtering using said calculated magnitude by estimation.

3. Communication device according to claim 1, wherein said means for obtaining channel information performs a phase alignment of a predetermined portion of the limited number of OFDM subcarrier signals with regard to the reference preamble symbol before the predetermined portion of said limited number of OFDM subcarrier signals and said reference preamble symbol are compared.

4. Method for transmitting and receiving OFDM signals in a wireless communication system, comprising:
   transmitting and receiving said OFDM signals propagated through a plurality of transmission channels in said wireless communication system by a plurality of antenna elements;
   obtaining channel information concerning attenuation properties of OFDM subcarrier signals transmitted through said plurality of transmission channels; and
   controlling amplitude of said OFDM subcarrier signals in accordance with said channel information,
   wherein the step of obtaining channel information comprises:
   calculating a magnitude ratio for a limited number of OFDM subcarrier signals received at each of said antenna by comparing a predetermined portion of said limited number of OFDM subcarrier signals with a reference preamble symbol to obtain the attenuation properties of said limited number of OFDM subcarrier signals
   and determining the attenuation properties of the rest of OFDM subcarrier signals from said calculated magnitude ratio by estimation.

5. Method according to claim 4, wherein the step of obtaining channel information comprises determining the attenuation properties of the rest of OFDM subcarrier signals by interpolation or filtering using said calculated magnitude by estimation.

6. Communication device according to claim 4, wherein the step of obtaining channel information comprises performing a phase alignment of a predetermined portion of the limited number of OFDM subcarrier signals with regard to the reference preamble symbol before the predetermined portion of said limited number of OFDM subcarrier signals and said reference preamble symbol are compared.

* * * * *